Dec. 31, 1935.   J. J. SINDLER   2,025,960
RETAINER DEVICE
Filed July 9, 1935
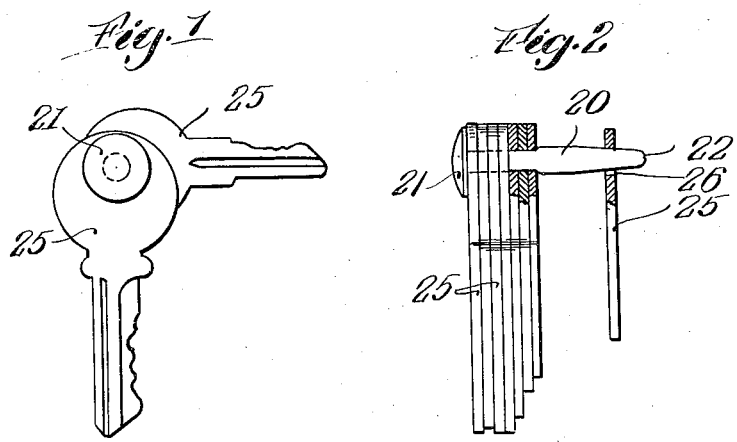
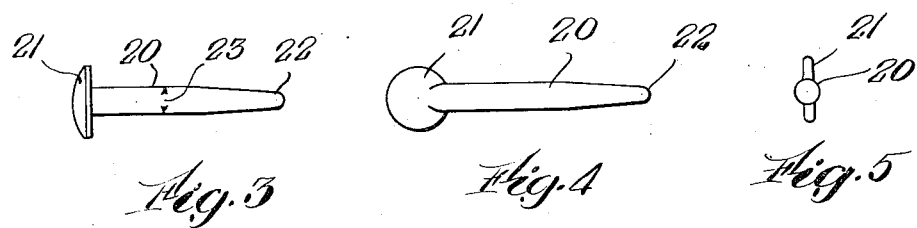
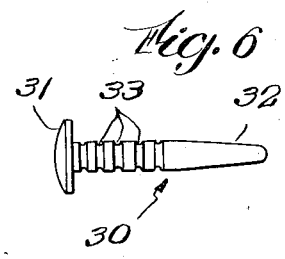

Patented Dec. 31, 1935

2,025,960

UNITED STATES PATENT OFFICE 2,025,960

RETAINER DEVICE

Jay J. Sindler, Boston, Mass.

Application July 9, 1935, Serial No. 30,473

3 Claims. (Cl. 59—98)

This invention relates to an improvement in a retainer device and is applicable for use with keys or other articles to prevent their loss or separation and to hold them yieldably in place.

The primary object of this invention is to provide a device made of rubber or other material which contracts when an extending force is exerted and tends to resume its normal condition when that force is relaxed, and which, when thus contracted, may be inserted into a hole or recess and, when the extending force is relaxed, will expand to substantially fill the hole or recess and thereby yieldably bear against the walls thereof.

For the purpose of illustrating this invention I have elected to describe and show in the accompanying drawing its application to the retaining of keys. It will be understood however that I am not limited thereby and that other applications come within the spirit and scope of this invention.

In the drawing:

Fig. 1 illustrates an assembly comprising a plurality of keys supported upon a device embodying one form of this invention;

Fig. 2 is a side elevation of the assembly shown in Fig. 1 certain of the keys being partly in section and one key being shown in a position prior to its association with the other keys;

Figs. 3 and 4 illustrate in elevation two types of devices which might be used in the assembly shown in Figs. 1 and 2;

Fig. 5 is an enlarged end view of the type shown in Fig. 4; and

Fig. 6 is a view in elevation of a device embodying another form of this invention.

The drawing discloses a post 20 having a head 21 at one end and a tapered tip 22 at the other end. The post 20 is here shown as cylindrical in form having a normal diameter indicated by the numeral 23. The diameter of the head 21 is greater and that of the tip 22 less than the normal post diameter 23. Supported by the post are a plurality of keys 25 each key having in its head a hole 26 through which the post is passed. The holes 26 in the key heads are generally of a diameter less than the normal diameter 23 of the post, whereby the keys are yieldably held against unwanted movement along or about the post. The keys are slipped over the post by first inserting the tip 22 through the hole 26 in a key, second grasping the tip and stretching the post to contract it diametrically, third sliding the key along the post until it reaches the desired location, which is usually adjacent the head 21, if no other keys are on the post, or adjacent the other keys, and fourth releasing the tip of the post and allowing it to approach its normal condition the diameter of the post increasing until it bears against the wall of the hole 26.

In place of the keys 25 the post 20 might be used to support washers, screw eyes, hooks or any other articles having holes or recesses through which the post will pass. The post may of course be other than cylindrical and its diameter be varied as required depending upon the size of the holes or recesses. The head 21 may be of any desired conformation for example rounded as shown in Fig. 3 or flat as shown in Fig. 4. The surface of the head may be conveniently used to receive any desired printing such as a mark or insignia for advertising purposes.

The device shown in Fig. 6 comprises a post 30 having a head 31 and tip 32, the head and tip bearing the same relation to the normal diameter of the post as pointed out above. In the surface of the post are formed a plurality of grooves or notches 33 which serve to separate the articles thereon. The diameters of the grooves may if desired be less than the diameters of the holes in the keys and obviously after the keys are slid over the extended post they may be received in these grooves. Any key can then be turned independently of the adjoining keys to separate it from the group when it is to be used.

I claim:

1. A device for retaining keys or other articles having holes or recesses therein comprising an extensible rubber post having a normal diameter which is greater than that of the hole or recess and which contracts when the post is extended and a tip freely insertable into the hole or recess in the article, the post being extended to reduce its diameter by pulling on the tip after the tip has been inserted through the hole or recess in an article, the article being then slid over the tip and along the post to the desired position and the tip being released whereupon the post tends to resume its normal diameter and to bear against the wall of the hole or recess.

2. A device comprising a rubber post on which a plurality of keys may be retained, said post having at one end a head and at the other end a tip, the head and tip being respectively greater and less in diameter than the holes in the keys and the normal diameter of the post being greater than such holes whereby it bears against the walls of the holes and retains the keys yieldably in position upon the post.

3. A device comprising a rubber post on which a plurality of keys may be retained having at one end a head and at the other end a tip, the head and tip being respectively greater and less in diameter than the holes in the keys and the normal diameter of the post being greater than such holes, the post having a plurality of separated grooves or notches therein adapted to receive the keys which keys are separated by the portions of the post between the grooves or notches whereby any key can be swung independently of the keys adjacent thereto.

JAY J. SINDLER.